United States Patent [19]

Liaw

[11] Patent Number: 5,275,516
[45] Date of Patent: Jan. 4, 1994

[54] STRUCTURES OF CLAMP HEAD OF NUMERICALLY CONTROLLED CUTTING TOOL

[76] Inventor: Jian-Kuen Liaw, 33, Pei-Feng Rd., Wu-Feng Hsiang, Taichung Hsien, Taiwan

[21] Appl. No.: 987,448

[22] Filed: Dec. 7, 1992

[51] Int. Cl.⁵ .............................................. B23B 31/30
[52] U.S. Cl. ................................... 409/136; 279/20; 408/59; 408/61
[58] Field of Search .................... 409/136; 408/59, 60, 408/61; 279/20

[56] References Cited

U.S. PATENT DOCUMENTS

| | | | |
|---|---|---|---|
| 935,484 | 9/1909 | Gallowics | 408/61 |
| 4,213,354 | 7/1980 | Dahinden | 408/61 X |
| 4,570,952 | 2/1986 | Heimbigner et al. | 279/20 |
| 4,640,652 | 2/1987 | Rivera, Jr. | 409/136 |
| 4,795,292 | 1/1989 | Dye | 409/136 |

Primary Examiner—Z. R. Bilinsky
Attorney, Agent, or Firm—Larson and Taylor

[57] ABSTRACT

A clamp head of numerically controlled cutting tool comprising front and rear sleeves and a main shaft. The rear sleeve is provided with a channel, while the tapered main shaft is composed of oil groove and hole. The front and the rear sleeves and the main shaft are united as a unitary body. The front and the rear sleeves are further provided with a nozzle apparatus permitting the coolant to be injected with precision on the working point.

1 Claim, 3 Drawing Sheets

STRUCTURES OF CLAMP HEAD OF NUMERICALLY CONTROLLED CUTTING TOOL

BACKGROUND OF THE INVENTION

The present invention relates to a numerically controlled tool, and more particularly to improved structures of clamp head of numerically controlled cutting tool.

A numerically controlled cutting tool is a precision machinery, which is a product of modern high technology; nevertheless it is by no means perfect. The clamp head of a numerically controlled cutting tool and its cooling system currently available are not as good as they should be. For example, the main shaft of the clamp head is generally vulnerable to becoming detached from the main body after a prolonged use of the cutting tool, thereby resulting in a potential safety hazard In addition, the cooling system of the cutting tool is defective in that it is less effective in view of the fact that the coolant is injected on the surface of the work piece intended to be worked on rather than on the working point.

As shown in FIG. 1, a clamp head of cutting tool of prior art comprises a rear sleeve 1A fitted with a push shaft 2A provided at lower end thereof with a plurality of clamp jaws 3A slidable in the rear sleeve 1A. The lower end of the rear sleeve 1A is locked in a front sleeve 1A. The rear sleeve 1A comprises at upper end thereof a locking thread 6A. There are a plurality of steel balls 7A between the locking thread 6 and the rear sleeve 1A. A locking shaft 5A is fitted over by a ferrule 8A. The clamp head is attached to the machine tool by coupling the locking shaft 5A with a main shaft 9. The prior art clamp head described above is defective in design in that its main shaft 9A is vulnerable to becoming detached during rotation and that its cooling system is less effective in view of the fact that it can not execute a cooling exclusively on the working point.

SUMMARY OF THE INVENTION

It is therefore the primary objective of the present invention to provide a clamp head having a main shaft whose front end is coupled with the rear sleeve of the main body so as to ensure that the clamp head and the main body do not become detached.

It is another objective of the present invention to provide a clamp head with means permitting the coolant to be injected on any specific point on the work piece.

It is still another objective of the present invention to provide a clamp head with means capable of cooling evenly the clamp tool and the cutting tool so as to improve the work efficiency and to prolong the service life of the tool.

The foregoing objectives and features of the present invention will be better understood by studying the following detailed description of a perferred embodiment of the present invention in conjunction with the drawings provided herewith.

BRIEF DESCRIPTION OF THE DRAWINGS

FIG. 4 shows a schematic view of the present invention provided with a drill head having oil hole.

FIG. 5 shows a schematic view of the present invention provided with a drill head without oil hole.

DETAILED DESCDRIPTION OF THE PREFERRED EMBODIMENT

Figure 1:
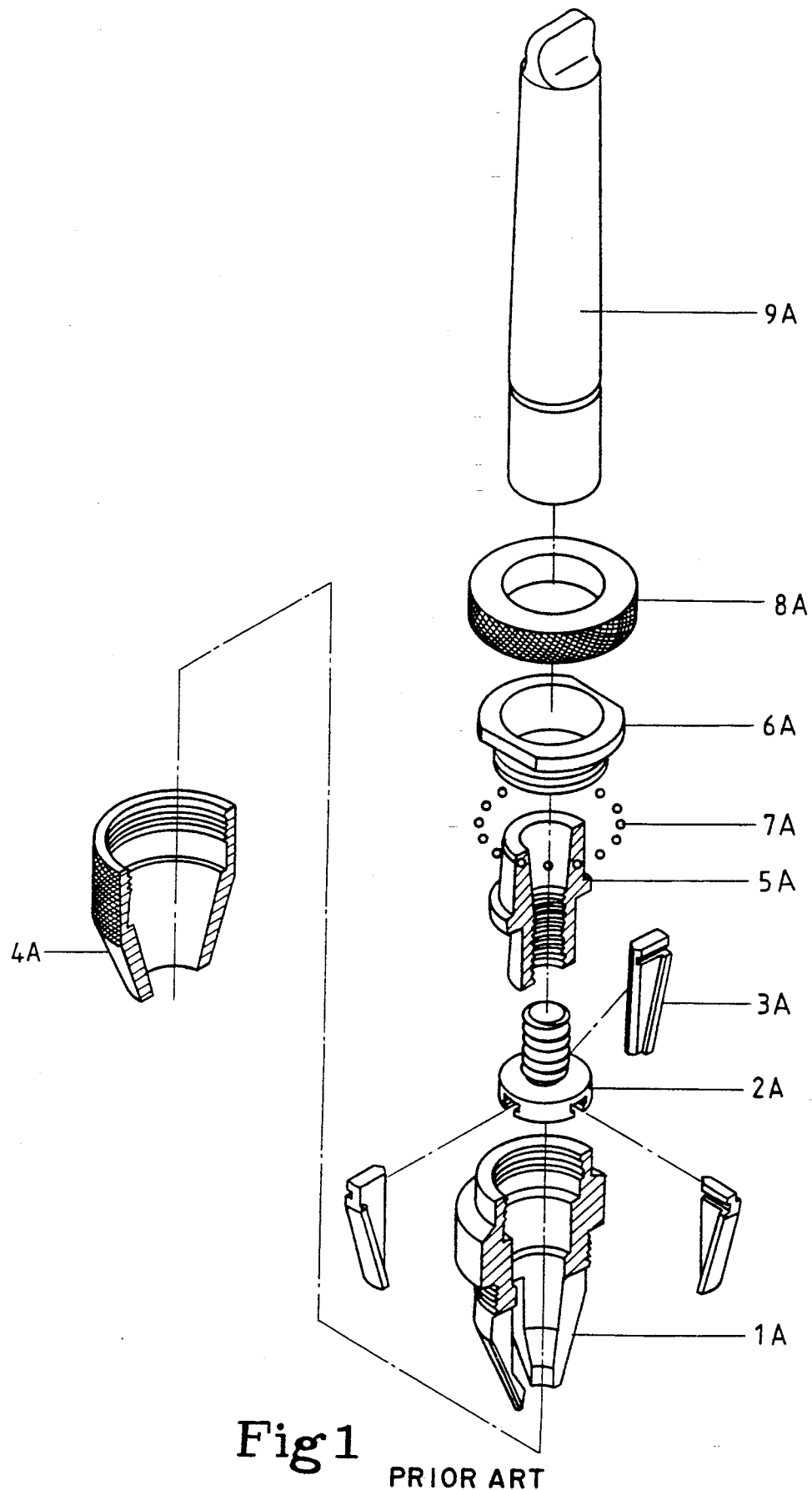
FIG. 1 shows an exploded view of a clamp head of cutting tool of prior art.
Figure 2:
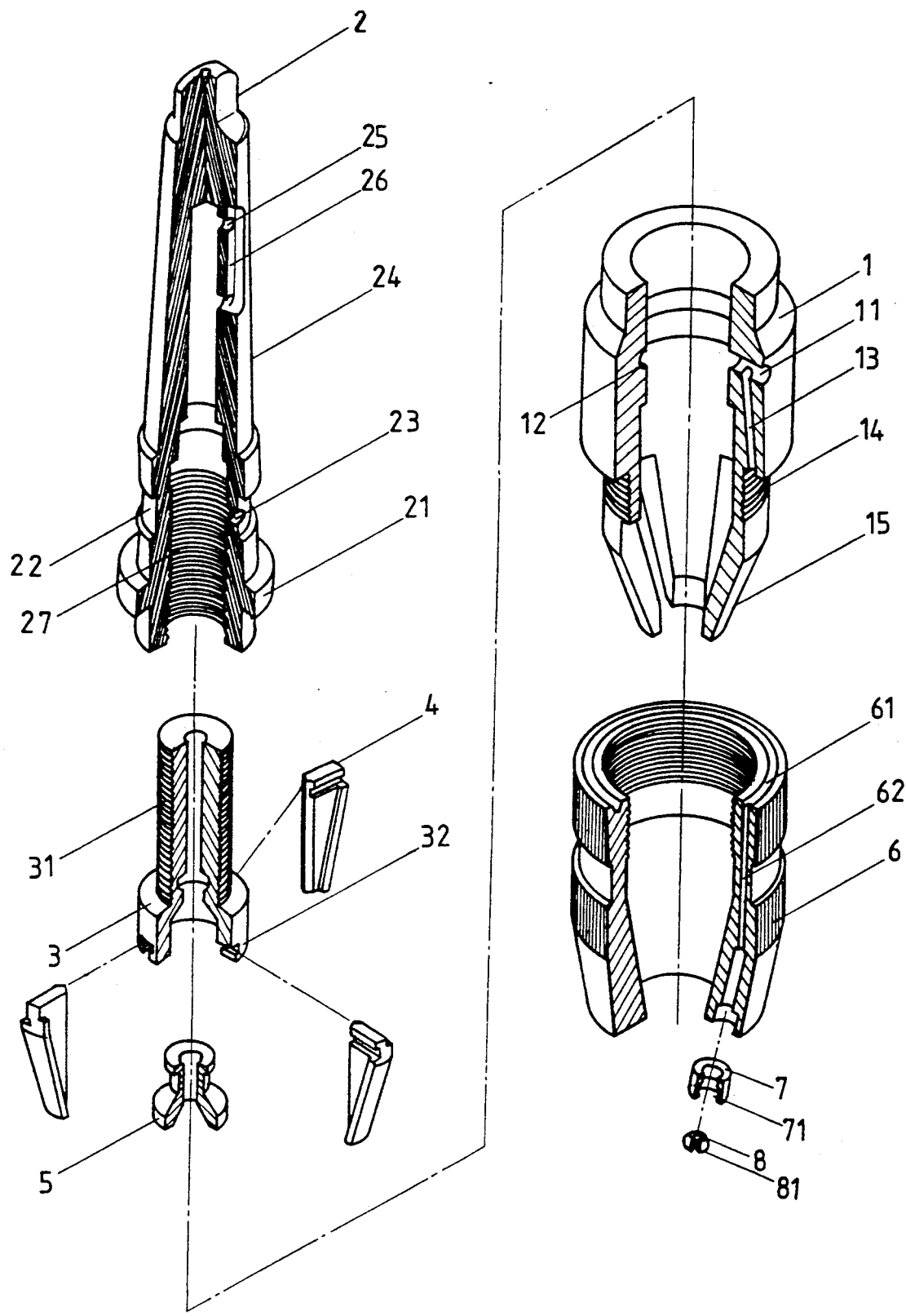
FIG. 2 shows an exploded view of a clamp head of cutting tool of the present invention.

Referring to FIG. 2, the present invention is shown comprising a clamp head rear sleeve 1 having a through oil hole 11 provided therein with a ring 12. The oil hole 11 is provided at lower end thereof with a bevel hole 13, while the rear sleeve 1 is provided at mid-section thereof with a locking thread 14. In addition, located at the lower end of the rear sleeve 1 are a plurality of sliding grooves 15 . A retaining shaft 21 of a main shaft 2 is fitted in the rear sleeve 1. Located at the oil hole 11 of the retaining shaft 21 is a recess 22 provided with a thorugh hole 23. The tapered shaft 24 of the main shaft 1 is provided at mid-section thereof with an oil entry groove 25 and an oil entry hole 26. The main shaft 1 is provided on the inner wall at the bottom thereof with a drive thread 27 engaging a cooperating thread 31 of a push rod 3 which comprises a guide sliding groove 32 provided with a clamp jaw 4 having an airtight plug 5. A front sleeve 6 is fitted to the locking thread 14 of the rear sleeve 1, which comprises a circular groove 61 corresponding to the bevel hole 13 and having a guide flow hole 62 provided at front end thereof with a water injecting base 7 which in turn comprises a spherical hole 71 provided therein with a water injecting head 8 with a thread 81 disposed therein.

Figure 3:
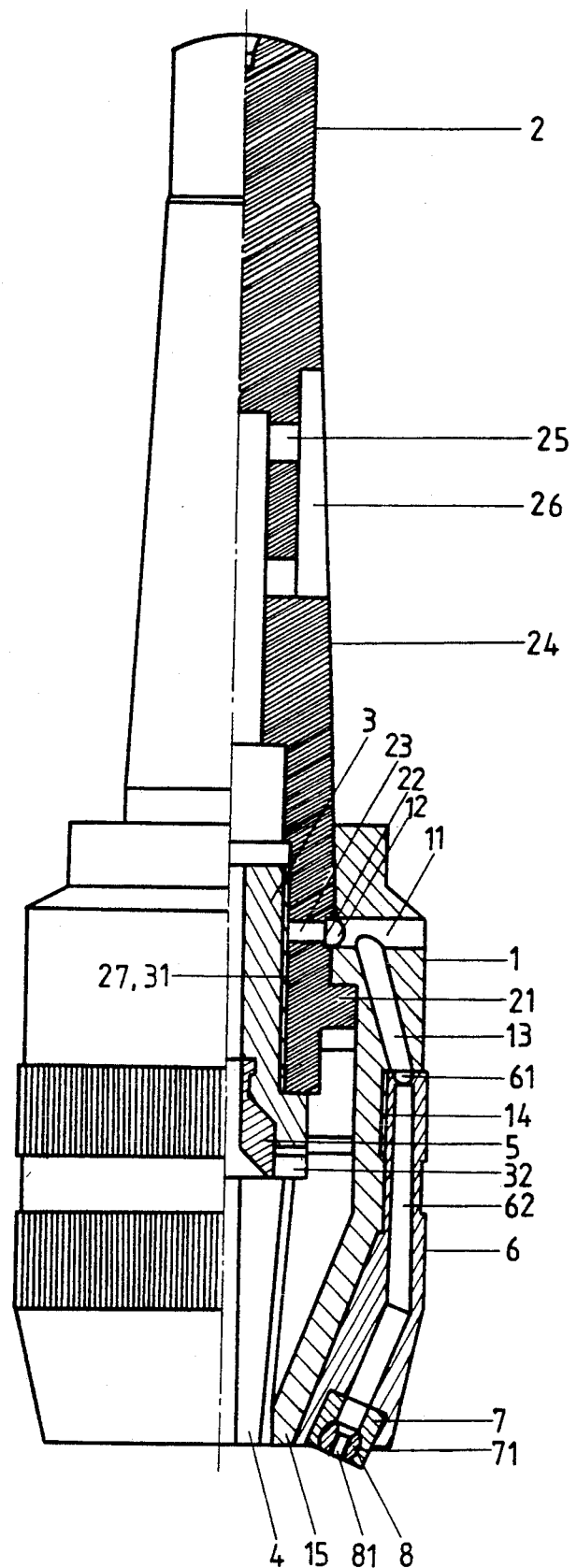
FIG. 3 shows a sectional view of the present invention in combination.

Now referring to FIG. 3, the tapered shaft 24 of the main shaft 2 is shown forming a unitary body with the retaining shaft 21. When the main shaft 2 is fitted into a machine tool M, the coolant folws into the main shaft 2 from an oil tank 25 via the oil entry hole 26. When the drill head 9 having oil holes is used, the coolant is injected on the working point P via a coolant hole 91, as shown in FIG. 4. When an ordinary drill head 9' is used, the flow of coolant is obstructed by the airtight plug 5, thereby resulting in a cooling effect of the clamp tool and the top end of drill head . At this moment, the coolant can be directed precisely to inject on the working point P in view of the facts that the coolant flows to the water injecting 7 from the oil entry hole 11 of the rear sleeve 1 via the guide flow hole 62 of the bevel hole 13 and that the water injecting head 8 of spherical construction can be asjusted angularly, as shown in FIG. 5.

The embodiment of the present invention described above is to be considered in all respects as merely an illustration of principles of the present invention. Accordingly, the present invention is to be limited only by the scope of the hereinafter appended claims.

What is claimed is:

1. Improved structures of clamp head of numerically controlled cutting tool comprising a retaining shaft disposed in a rear sleeve of said clamp head, said retaining shaft comprising at upper end thereof a tapered main shaft , said rear sleeve comprising a through oil entry hole provided therein with a ring and at lower end thereof with a bevel hole, said rear sleeve further comprising a water injecting base located correspondingly to said bevel hole and provided with a spherical hole having therein a water injecting head of spherical construction, said water injecting head having therein a thread, said main shaft further comprising an oil entry groove and an oil entry hole, said main shaft engaging at front end thereof a push rod provided therein an airtight plug, said tapered main shaft and said retaining shaft forming a unitary body.

* * * * *